United States Patent Office 2,731,918
Patented Jan. 24, 1956

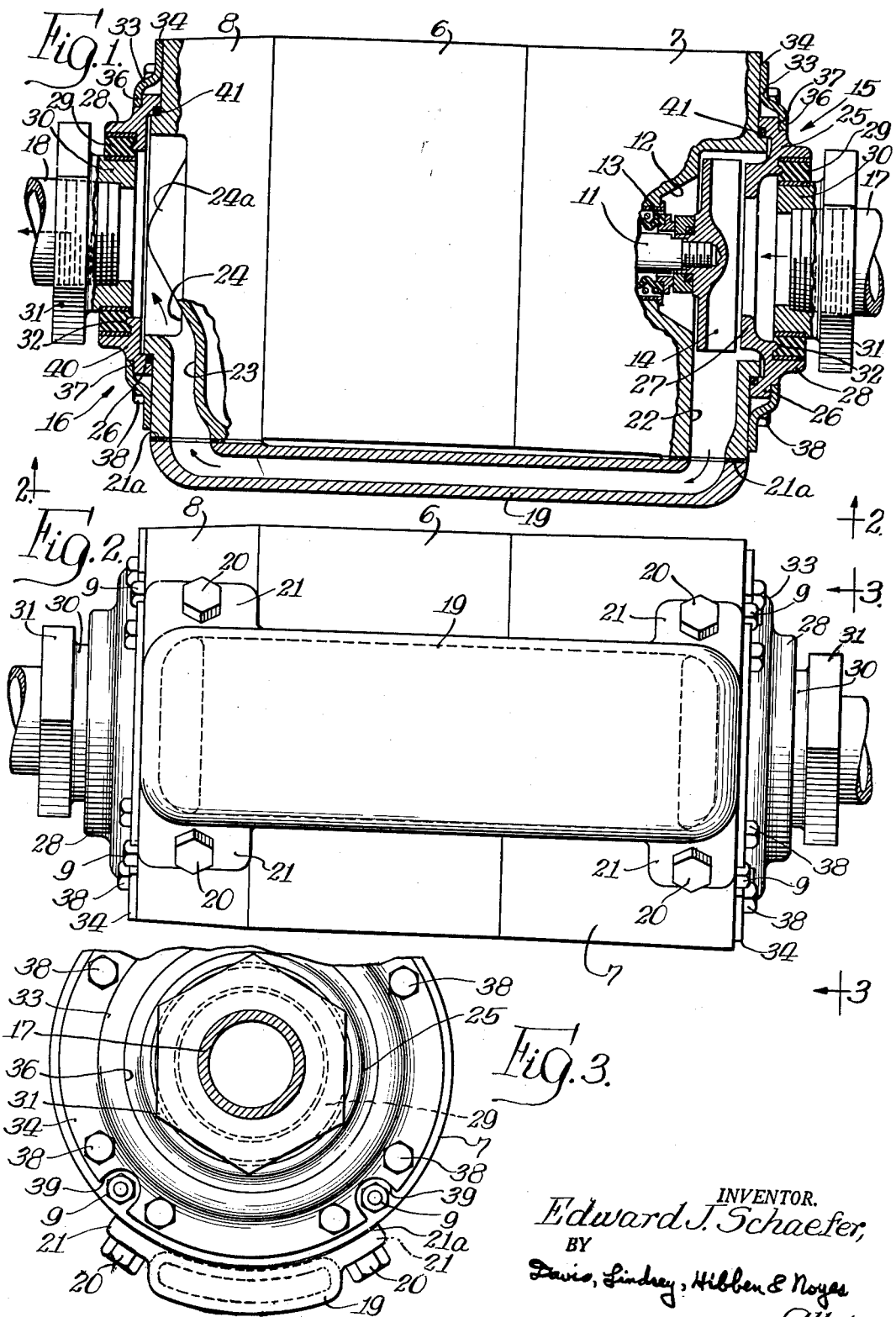

2,731,918

MOTOR PUMP UNIT

Edward J. Schaefer, Fort Wayne, Ind.

Application October 3, 1951, Serial No. 249,565

5 Claims. (Cl. 103—87)

This invention relates to improvements in a motor pump unit of the type adapted to be connected directly in a pipe line and known to the trade as a circulator pump.

A primary object of the invention is to provide a motor pump unit having a common axis of mounting and rotation but in which the fluid being pumped does not pass through the interior of the motor.

A further object of the invention is to provide a motor pump unit having improved coupling means for connecting the unit in a pipe line.

Other objects and advantages of the invention will become apparent from the subsequent detailed description taken in conjunction with the accompanying drawing wherein:

Fig. 1 is a longitudinal sectional view of a motor pump unit comprising a preferred embodiment of my invention and showing the unit in connected position in a pipe line;

Fig. 2 is a side elevational view as seen along the line 2—2 of Fig. 1; and

Fig. 3 is a fragmentary end view as seen along the line 3—3 of Fig. 1.

Referring now to the drawing, a motor pump unit comprising one specific embodiment of my invention is shown, wherein the housing for the unit is generally cylindrical and comprises three sections secured in end-to-end relation, namely, a central section 6 containing the stator and rotor in the usual operating relation, an end bell 7 at the inlet end of the unit, and an end bell 8 at the outlet end of the unit. These sections are held together by means of a plurality of elongated threaded members or studs having suitable nuts 9 secured thereto and bearing against the end bells 7 and 8. The rotor shaft of the motor extends outwardly, as at 11, into an axial recess or chamber 12 in the end bell 7 and a mechanical rotating seal 13 is provided to prevent water or other fluid being pumped from entering the motor chamber. An impeller 14 is secured to the outer end portion 11 of the rotor shaft for rotation therewith within the recess 12, the latter thereby constituting the pump chamber of the device. Coupling means, indicated generally at 15 and 16 and described hereinafter in detail, are provided adjacent the end bells 7 and 8 for securing the motor pump unit to the threaded ends of a pair of inlet and outlet pipes 17 and 18, respectively, the pipes being thereby connected in coaxial relation with the rotor shaft of the motor.

For providing flow communication between the inlet pipe 17 and the outlet pipe 18, a fluid conduit in the form of an elongated manifold or hollow chamber 19 is secured longitudinally to the outside of the unit and parallel to the axis thereof by means of a plurality of screws 20 (Fig. 2) extending through a plurality of lateral bosses 21 into suitable mating bosses provided at the sides of the end bells 7 and 8. A pair of gaskets 21a are disposed between the bosses to insure a fluid tight connection between the manifold and the housing. It will be seen from Fig. 1 that the coacting bosses at each end of the unit serve to space the manifold 19 outwardly to a slight extent from the housing with the manifold bridging the distance between the end bells whereby to permit the manifold to be drawn up tightly against the gaskets by means of the screws 20. Also, the spacing of the manifold from the housing minimizes heat transmission between the manifold and the motor. In addition, the manifold 19 is relatively thin and has a transverse or lateral curvature (Fig. 3) to conform to the external contour of the cylindrical housing of the unit. A radially extending passage 22 is provided in the end bell 7 and communicates with the impeller chamber 12 and the manifold 19. A similar radial passage 23 is provided in the end bell 8 for permitting the flow of fluid from the manifold 19 into an axial recess 24 formed in the end bell 8 and thence into the outlet pipe 18. The end bell 8 has a dome-shaped projection 24a extending into the recess 24 for directing the outlet fluid into the pipe 18. With the manifold 19 connected only to the end bells 7 and 8, the central section 6 containing the stator and rotor may be of the usual construction and does not have to be of special design.

It will be understood that the recess or chamber 24 at the outlet end of the unit is completely sealed from the motor section 6, i. e. there is no access of fluid to the motor chamber at the outlet end of the unit. Thus, as indicated by the arrows in Fig. 1, the operation of the impeller 14 draws liquid in from the pipe 17 and causes the pumped liquid to flow through the passageway 22 and the manifold 19 and thence through the passageway 23 into the recess 24 and the outlet pipe 18. The motor section being effectively sealed from liquid at both ends thereof and the pumped fluid being passed through the manifold 19 exteriorly of the motor section, it will be seen that there is no contact between the motor and the fluid being pumped.

As hereinbefore mentioned, a coupling means 15 is provided at the inlet end of the unit for connecting the device to the inlet pipe 17 and, in addition, the coupling means 15 includes a resilient cushion to minimize the transmission of mechanical vibrations and also a deflector for directing the flow of inlet fluid into the center of the impeller 14. As seen in Fig. 1, the coupling means 15 comprises an annular member 25 having an outwardly directed radial flange portion 26 adapted to seat against the outer face of the end bell 7 and an inwardly directed radial flange portion 27 comprising a deflector which extends axially into the pump chamber 12 for guiding the flow of inlet liquid axially into the center of the rotating impeller 14. The element 25 is also formed with an integral tubular portion 28 extending axially and outwardly from the unit. A resilient cushion ring 29 of rubber or the like is permanently secured within the tubular portion 28 of the member 24 and has permanently mounted therein an internally threaded bushing 30 into which the inlet pipe 17 is threaded. The bushing 30 has an integral hexagonal portion 31 which can be gripped by a wrench or the like for attaching the same to the pipe 17. It will be understood that the annular member 25, the cushion ring 29, and the bushing 30 are thus secured in unitary permanently assembled relation for attachment to the pipe 17 as a unit. An outwardly extending annular bead 32 is provided integrally on the member 25 for engaging the axial inner end of the cushion ring 29 and thereby assisting in holding the parts in secured relation.

The annular element 25 having the cushion ring 29 and the bushing 30 secured thereto in unitary relation is detachably fastened to the end bell 7 by means of a separate concentric clamping ring 33 which is rotatively adjustable relative to the element 25 and the end bell 7 for facilitating the connection of the unit in the pipe line.

The ring 33 is formed with an outermost portion 34 adapted to bear flatwise against the end bell 7 and an axially offset inner portion 36 adapted to seat in a coacting circumferential shoulder 37 provided at the exterior of the member 25. The clamping ring 33 is detachably secured to the end bell 7 by means of a plurality of screws 38 extending through suitable apertures provided in only the outer portion 34 of the clamping ring whereby the screws 38 do not directly engage or retain the annular member 25. The outer peripheral portion 34 of the ring 33 is notched, as at 39 (Fig. 3), to receive the nuts 9.

The coupling means 16 at the opposite end bell 8 of the unit is generally similar to the coupling means 15 except that the annular member, indicated at 40 and corresponding to the member 25, does not have the fluid deflector portion 27. In all other respects the structure is identical and similar reference numerals are used to indicate the analogous parts of the coupling.

In connecting the unit in a pipe line, the clamping rings 33 are first fitted over the pipe ends and the unitary members 25—29—30 and 40—29—30 are then screwed on the threaded ends of the inlet and outlet pipes 17 and 18, respectively. The motor pump unit is then inserted between the annular elements 25 and 40 of the end fitting and the clamping rings 33 are adjusted rotatively to align the screw apertures therein with the corresponding screw holes in the end bells 7 and 8. Finally, the screws 38 are inserted and tightened whereby the elements 25 and 40 are clamped in final assembled position. An O ring seal 41 is interposed between each of the end bells and the corresponding flange portion 26 of its end fitting in order to insure a fluid-tight connection.

By means of the foregoing construction, it will be seen that my invention provides a motor pump unit of the type adapted to be connected directly in coaxial relation in a pipe line and to be supported thereby but without the necessity of passing the pumped fluid through the interior or operating region of the motor section. This desirable arrangement is achieved by utilizing a portion of the end bell structure at the inlet end of the unit as a pump housing and by providing an external manifold secured exteriorly of the motor for the passage of pumped fluid between the inlet and outlet pipes. In addition, the fittings at the opposite ends of the unit for connecting the unit in the pipe line are designed for simple and rapid attachment and detachment relative to the unit and connecting pipes. By reason of the two part construction of these fittings, the desired rotary or angular adjustment of the motor pump unit relative to the pipe line can be readily achieved before final clamping of the fittings to the unit. The provision of the cushion rings 29 of rubber or the like as an intermediate portion of the end fittings minimizes the transmission of mechanical vibration from the motor to the pipe line.

Although the invention has been described primarily in relation to a specific structural embodiment thereof, it will be understood that various modifications and equivalent structures may be resorted to without departing from the scope of the invention as defined in the appended claims.

I claim:

1. A motor pump unit comprising an elongated housing with a generally rounded external contour and having a motor section sealed against the access of pumped fluid thereto, a pump and fluid inlet section at one end of said motor section, and a fluid discharge section at the opposite end of said motor section, a motor in said motor section, an impeller in said pump and fluid inlet section operatively connected to the motor, an elongated manifold mounted at the exterior of said housing at one side thereof and parallel to the axis thereof, and coacting means at the opposite ends of said manifold and said housing for securing the manifold to the housing with the manifold spaced outwardly from the housing intermediate its ends, said manifold having fluid communication at its ends with the end sections of said housing for permitting the passage of pumped fluid therethrough without contact with said motor and said manifold also having transverse curvature to conform generally to the rounded contour of said housing.

2. A motor pump unit comprising a motor, an elongated generally cylindrical housing for said motor providing a pump chamber at one end thereof, an impeller in said pump chamber operatively connected to said motor, coupling means cooperating with the opposite ends of said housing for connecting the unit in a pipe line, and an elongated relatively thin hollow manifold secured longitudinally to the exterior of said housing at one side thereof and being curved transversely to conform to the external curvature of said housing, said manifold being in fluid communication at its opposite ends with said pump chamber and with the opposite end of the housing for permitting the passage of pumped fluid through the unit without contacting said motor and said manifold also being spaced outwardly from said housing intermediate its ends.

3. A motor pump unit comprising a motor having a rotor shaft and an external housing with a generally rounded external contour, a pair of end bells secured at the opposite axial ends of said housing, one of said bells having an inwardly extending axial recess defining a pump chamber and having the rotor shaft of the motor projecting thereinto, an impeller connected to the end of the rotor shaft in said pump chamber, a seal around the projecting end of said shaft to prevent access of fluid from the pump chamber to the interior of the motor, an elongated manifold secured at its opposite ends to the sides of said end bells and extending exteriorly of the motor housing, said manifold being transversely curved to conform generally to the rounded contour of said housing and said end bells having internal passages communicating with said manifold for permitting the passage of pumped fluid between the opposite axial ends of the unit without contacting said motor and coacting bosses at the opposite ends of said manifold and on the sides of said end bells whereby said manifold is spaced outwardly from said housing and bridges the distance between said end bells, the spaced relation of said manifold and said housing permitting the bosses on said manifold to be tightly fastened to the bosses on said end bells with gasket means therebetween.

4. A motor pump unit comprising a motor, housing structure for said motor providing a pump chamber at one end thereof, an impeller in said pump chamber operatively connected to said motor, and coupling means at the opposite axial ends of the housing structure for connecting the unit in a pipe line, one of said coupling means comprising a one-piece annular member having an outwardly directed radial flange portion seated against the end of the housing structure adjacent said pump chamber and having a radially inwardly directed flange portion integral therewith and extending axially into said pump chamber for deflecting inlet fluid into the center of said impeller, said annular member also having a tubular portion intermediate said flange portions and extending axially in the opposite direction, a bushing carried in said tubular portion and adapted to be attached to the pipe line, a resilient cushion interposed between said tubular portion and said bushing and permanently secured thereto, and a separate clamping ring adapted to fit concentrically around the outwardly directed radial flange portion of said annular member in clamping engagement therewith and adapted to be secured to the end of the housing structure.

5. A motor pump unit comprising a motor section, a motor in said motor section, end bells secured to opposite ends of said motor section and adapted to be connected to pipes, said motor section and said end bells having a generally rounded external contour and one of said end bells having a pump chamber therein to receive water from the pipe connected thereto and having a lateral passage extending from the pump chamber, a pump in said pump chamber driven by said motor, the other end bell having a lateral passage adapted to communicate with the pipe connected thereto, and an elongated manifold secured at its ends to the end bells and transversely curved to conform generally to said rounded contour and communicating with said lateral passages, said manifold being spaced outwardly from said motor section intermediate said end bells.

References Cited in the file of this patent

UNITED STATES PATENTS

| Number | Name | Date |
|---|---|---|
| 712,022 | Underhill | Oct. 28, 1902 |
| 1,425,308 | Woock | Aug. 8, 1922 |
| 1,974,183 | Gunderson | Sept. 18, 1934 |
| 2,422,597 | Stewart | June 17, 1947 |
| 2,480,203 | Steuer | Aug. 20, 1949 |
| 2,485,408 | Pezzillo | Oct. 18, 1949 |
| 2,520,880 | Harlamoff | Aug. 29, 1950 |
| 2,554,191 | Huber | May 22, 1951 |

FOREIGN PATENTS

| Number | Country | Date |
|---|---|---|
| 403,602 | Great Britain | Dec. 28, 1933 |
| 405,570 | Great Britain | Feb. 8, 1934 |
| 500,204 | Germany | June 19, 1930 |
| 794,872 | France | Dec. 26, 1935 |